(12) United States Patent
Hunter et al.

(10) Patent No.: US 8,038,542 B2
(45) Date of Patent: Oct. 18, 2011

(54) LINEAR MOTOR DRIVEN AMUSEMENT RIDE AND METHOD

(75) Inventors: Richard D. Hunter, Ottawa (CA); Andreas Tanzer, Gatineau (CA)

(73) Assignee: HM Attractions Inc. (CA)

( * ) Notice: Subject to any disclaimer, the term of this patent is extended or adjusted under 35 U.S.C. 154(b) by 1138 days.

(21) Appl. No.: 11/681,712

(22) Filed: Mar. 2, 2007

(65) Prior Publication Data

US 2007/0207867 A1   Sep. 6, 2007

Related U.S. Application Data

(60) Provisional application No. 60/778,384, filed on Mar. 3, 2006.

(51) Int. Cl.
*A63G 21/18* (2006.01)
*A63G 21/00* (2006.01)

(52) U.S. Cl. ............. 472/117; 472/129; 472/13; 104/69

(58) Field of Classification Search ............. 472/13, 472/116–117, 128–129; 104/53, 59, 60, 104/69–73, 281, 282, 290, 292
See application file for complete search history.

(56) References Cited

U.S. PATENT DOCUMENTS

| | | |
|---|---|---|
| 3,404,635 A | 10/1968 | Bacon et al. |
| 3,577,928 A | 5/1971 | Victorri |
| 3,585,939 A | 6/1971 | Laithwaite et al. |
| 3,667,397 A | 6/1972 | Haynes |
| 3,667,398 A | 6/1972 | English |
| 3,770,995 A | 11/1973 | Eastham et al. |
| 3,830,161 A | 8/1974 | Bacon |
| 3,947,741 A | 3/1976 | Ball et al. |
| 3,952,666 A | 4/1976 | Gladish |
| 4,063,517 A | 12/1977 | Nardozzi, Jr. |
| 4,233,906 A | 11/1980 | Seiler |
| 4,299,171 A | 11/1981 | Larson |
| 4,484,739 A | 11/1984 | Kreinbihl et al. |
| 4,991,514 A | 2/1991 | Powell et al. |
| 5,277,125 A | 1/1994 | DiFonso et al. |
| 5,403,238 A | 4/1995 | Baxter et al. |
| 5,433,671 A | 7/1995 | Davis |
| 5,540,622 A | 7/1996 | Gold et al. |

(Continued)

FOREIGN PATENT DOCUMENTS

CA   2473804   8/2003

(Continued)

OTHER PUBLICATIONS

International Search Report for PCT/CA2007/000334, dated Jun. 14, 2007.

(Continued)

*Primary Examiner* — Kien T Nguyen
(74) *Attorney, Agent, or Firm* — Barnes & Thornburg LLP

(57) ABSTRACT

A waterslide amusement ride having in a portion thereof, a linear induction motor to efficiently and effectively affect the motion of a vehicle sliding on the ride. The linear induction motor comprises linear induction motor units embedded below a sliding surface, and a reaction plate mounted to the bottom of the vehicle. Depending on the configuration of the linear induction motor units and the reaction plate, the linear induction motor drive can be used to accelerate the vehicle, decelerate the vehicle, maintain the speed of the vehicle up an uphill section, or rotate the vehicle.

52 Claims, 10 Drawing Sheets

U.S. PATENT DOCUMENTS

| | | | |
|---|---|---|---|
| 5,860,364 | A | 1/1999 | McKoy |
| 6,237,499 | B1 | 5/2001 | McKoy |
| 6,354,223 | B2 | 3/2002 | McKoy |
| 6,397,755 | B1 | 6/2002 | Kamler |
| 6,413,165 | B1 | 7/2002 | Crandall et al. |
| 6,485,372 | B2 | 11/2002 | Stuart et al. |
| 6,527,646 | B1 * | 3/2003 | Briggs .................. 472/117 |
| 6,629,501 | B2 | 10/2003 | McKoy |
| 6,659,237 | B1 | 12/2003 | Pribonic |
| 6,856,048 | B2 | 2/2005 | Funken et al. |
| 6,857,964 | B2 | 2/2005 | Hunter |
| 6,860,209 | B2 | 3/2005 | McKoy |
| 6,971,317 | B2 | 12/2005 | McKoy |
| 7,056,220 | B2 | 6/2006 | Hunter |
| D548,810 | S | 8/2007 | Hunter |
| D567,322 | S | 4/2008 | Hunter |
| 7,371,183 | B2 | 5/2008 | Henry et al. |
| 7,437,998 | B2 | 10/2008 | Burger et al. |
| 7,597,630 | B2 | 10/2009 | Henry |
| 7,713,134 | B2 | 5/2010 | Hunter |
| 7,740,542 | B2 | 6/2010 | Henry et al. |
| 2002/0142851 | A1 | 10/2002 | Hunter |
| 2004/0077426 | A1 | 4/2004 | Hunter |
| 2005/0098057 | A1 | 5/2005 | McKoy |
| 2005/0192108 | A1 | 9/2005 | Hunter |
| 2005/0288112 | A1 | 12/2005 | Hunter |
| 2006/0219124 | A1 | 10/2006 | Jordan |
| 2007/0034106 | A1 | 2/2007 | Miller et al. |
| 2007/0060403 | A1 | 3/2007 | Henry et al. |
| 2007/0204759 | A1 | 9/2007 | Hunter |
| 2007/0207866 | A1 | 9/2007 | Hunter |
| 2007/0207869 | A1 | 9/2007 | Hunter |

FOREIGN PATENT DOCUMENTS

| | | |
|---|---|---|
| DE | 4344755 | 6/1995 |
| EP | 0 487 744 | 6/1991 |
| GB | 1307833 | 2/1973 |
| JP | 54035914 | 3/1979 |
| JP | 3027703 | 2/1991 |
| WO | 9831444 | 7/1998 |
| WO | WO-9831444 | 7/1998 |
| WO | 2004085744 | 10/2004 |
| WO | WO-2004085744 | 10/2004 |

OTHER PUBLICATIONS

Chinese office action in Chinese Patent Application No. 200780007714.3 (3 pages), with 3 pages of English translation, Feb. 26, 2010.

Jan. 20, 2010 Office Action in European Patent Application No. 07 250 876.5-2318 (4 pages).

Chinese Office Action in Chinese Patent Application No. 200780007714.3 (3 pages, with 3 pages of English translation), dated Feb. 2010.

International Search Report for PCT/CA2007/000333, dated Jun. 15, 2007.

International Search Report for PCT/CA2007/000329, dated Jun. 5, 2007.

European Search Report for EP 07250876, dated Jun. 5, 2007.

* cited by examiner

LINEAR MOTOR DRIVEN AMUSEMENT RIDE AND METHOD

RELATED APPLICATIONS

This application claims the benefit of U.S. Provisional Application Ser. No. 60/778,384 filed Mar. 3, 2006, which is incorporated herein by reference in its entirety.

FIELD OF THE INVENTION

This invention relates generally to amusement rides, and in particular to rides in which participants ride in or on vehicles.

BACKGROUND OF THE INVENTION

In the past few decades, water-based amusement rides have become increasingly popular. Such rides can provide similar thrills to roller-coaster rides, with the additional features of the cooling effect of water and the excitement of being splashed.

The most common water-based amusement rides are flume-style waterslides in which a participant slides along a channel or "flume", either on his or her body, or on or in a vehicle. Water is provided in the flume to provide lubrication between the body/vehicle and the flume surface, and to provide the above-mentioned cooling and splashing effects. Typically, the motion of the participant in the flume is controlled predominantly by the contours of the flume (hills, valleys, turns, drops, etc.) in combination with gravity.

As thrill expectations of participants have increased, demand for greater control of participants' movement in the flume has correspondingly increased. Thus various techniques have been applied to accelerate or decelerate participants by means other than gravity. For example, a participant may be accelerated or decelerated using powerful water jets. Other rides use a conveyor belt to convey a participant to the top of a hill the participant would not otherwise crest on the basis of his or her momentum alone. For safety reasons, such techniques are generally used only on waterslides where the participant slides along the flume in a vehicle.

However, such existing means of controlling the movement of a participant can raise safety and comfort concerns even when he or she is riding in a vehicle. For example, a water jet powerful enough to affect the motion of a waterslide vehicle could injure the participant if he or she is hit in the face or back of the head by the jet, as might be the case if the participant falls out of the vehicle. Similarly, a participant extending a limb out of a vehicle could be injured by a fast-moving conveyor belt.

SUMMARY OF THE INVENTION

In one aspect, the invention provides an amusement ride feature comprising a sliding surface, a vehicle adapted to slide on said sliding surface and to convey at least one rider thereon; and a linear motor associated with the vehicle and the sliding surface for affecting sliding motion of the vehicle on the sliding surface.

In a second aspect, the invention provides an amusement ride which includes a feature comprising a sliding surface, a vehicle adapted to slide on said sliding surface and to convey at least one rider thereon, and a linear motor associated with the vehicle and the sliding surface for affecting sliding motion of the vehicle on the sliding surface.

In a third aspect, the invention provides a method of controlling the sliding motion of a vehicle sliding on a sliding surface in an amusement ride, comprising operating a linear motor associated with the vehicle and the sliding surface.

In a fourth aspect, the invention provides a method of controlling the sliding motion of a vehicle sliding on a sliding surface in an amusement ride, comprising providing the sliding surface, placing the vehicle on the sliding surface, and operating a linear motor associated with the vehicle and the sliding surface.

In a fifth aspect, the invention provides an amusement ride sliding surface for bearing a vehicle in sliding relationship thereto, said vehicle conveying at least one rider and having affixed thereto at least one reaction component, said sliding surface having located therebeneath, a plurality of linear induction motor units for interacting with the at least one reaction component affixed to the vehicle to affect sliding motion of the vehicle on the sliding surface.

In a sixth aspect, the invention provides an amusement ride vehicle adapted to slide on an amusement ride sliding surface and to convey at least one rider thereon, said vehicle having affixed thereto at least one reaction plate for interacting with linear induction motor units associated with the sliding surface to affect sliding motion of the vehicle on the sliding surface.

The sliding surface may be a waterslide and may be flume-style. The linear motor may comprise a reaction plate mounted at a bottom of the vehicle as well as linear induction motor units mounted below the sliding surface.

BRIEF DESCRIPTION OF THE DRAWINGS

Embodiments of the invention will now be described with reference to the attached drawings in which.

DETAILED DESCRIPTION OF THE DRAWINGS

The present invention is directed to amusement rides in which participants ride in vehicles which slide on a sliding surface. As the term is used in the amusement ride industry, "sliding" refers to the action of moving substantially smoothly along a weight-bearing sliding surface while remaining substantially in contact with it. This is in contrast to "rolling" which refers to the action of moving along a weight bearing surface by the relative rotation of wheels, rollers, bearings, etc.

In a waterslide context, sliding is typically facilitated by the use of water as a lubricant between the vehicle and the sliding surface. In such cases, on occasion, such as when the layer of water has sufficient depth and the vehicle has sufficient speed or lubrication, direct contact between the vehicle and the flume may be lost very briefly and temporarily with the vehicle skimming atop a very thin layer of water. However, such temporary skimming is still considered to fall within the meaning of sliding in the waterslide context.

Embodiments will now be described.

Flume-style waterslides typically comprise a channel or "flume" supplied with water and which accommodates a vehicle for sliding therein. The flume typically has hills and valleys as well as turns to increase the excitement of the ride for the participant. While the amusement ride described below is a flume-style waterslide, it is to be understood that in a broad sense, the invention relates to amusement rides generally.

Figure 1:
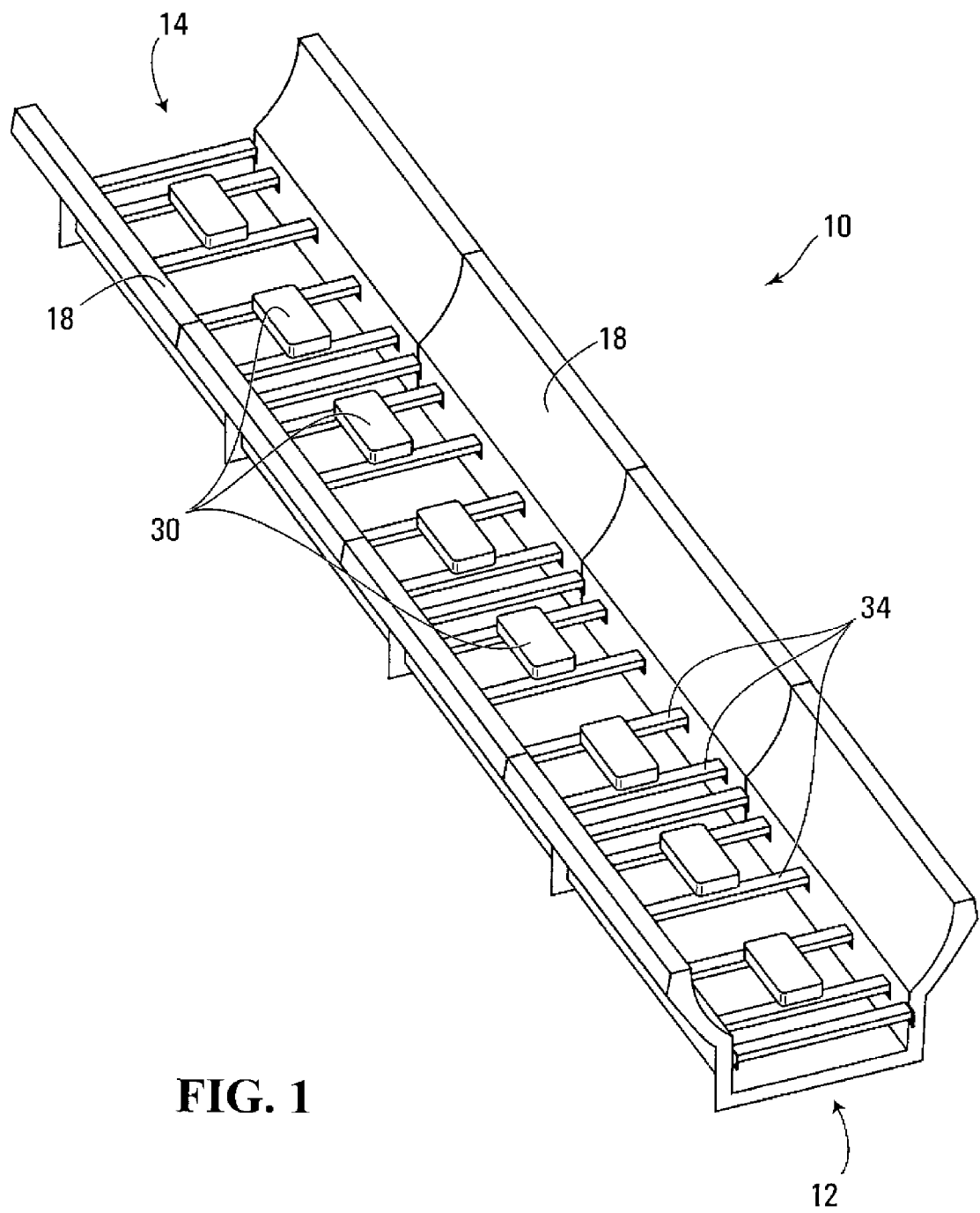
FIG. 1 is a perspective view of an uphill section of a flume of an embodiment of the present invention with a sliding surface of the flume removed to show components underneath.

FIG. 1 shows an exemplary uphill section of such a flume 10 in accordance with a first embodiment of the invention, in which the vehicle would normally move from the right to the left. In operation the illustrated section is connected at its entry 12 and exit 14 ends to other sections of the flume ride so as to provide a continuous flume from start to finish of the ride. The illustrated section would also normally be supported underneath by appropriate framing (not shown), or by a sloped section of land (not shown). In this figure, a sliding surface 16 of the flume has been removed, such that elements located beneath this sliding surface 16 can be seen.

Figure 2:
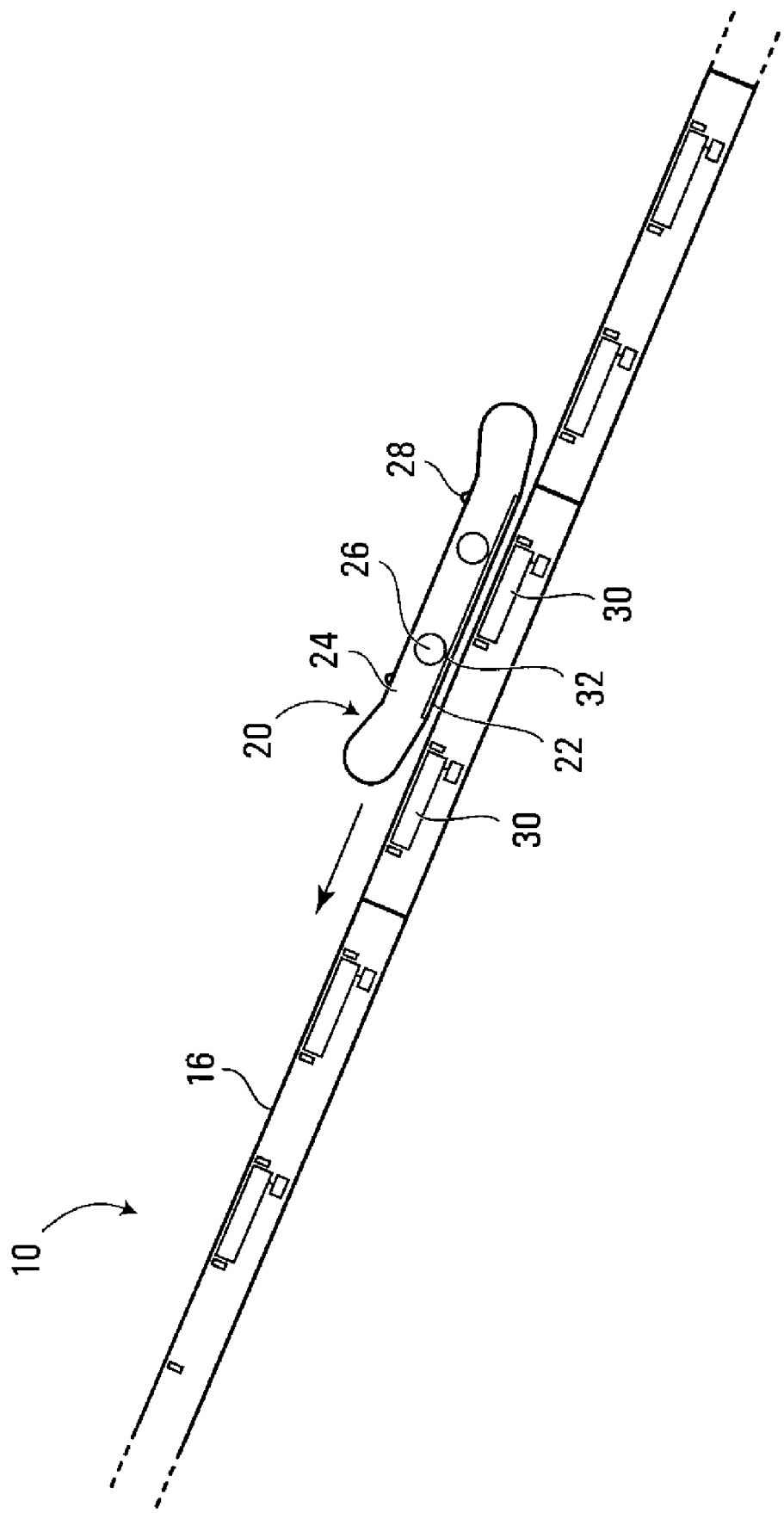
FIG. 2 is a side cross-sectional view of a portion of the uphill flume section of FIG. 1 with the side walls of the flume removed to show a vehicle thereon.
Figure 3:
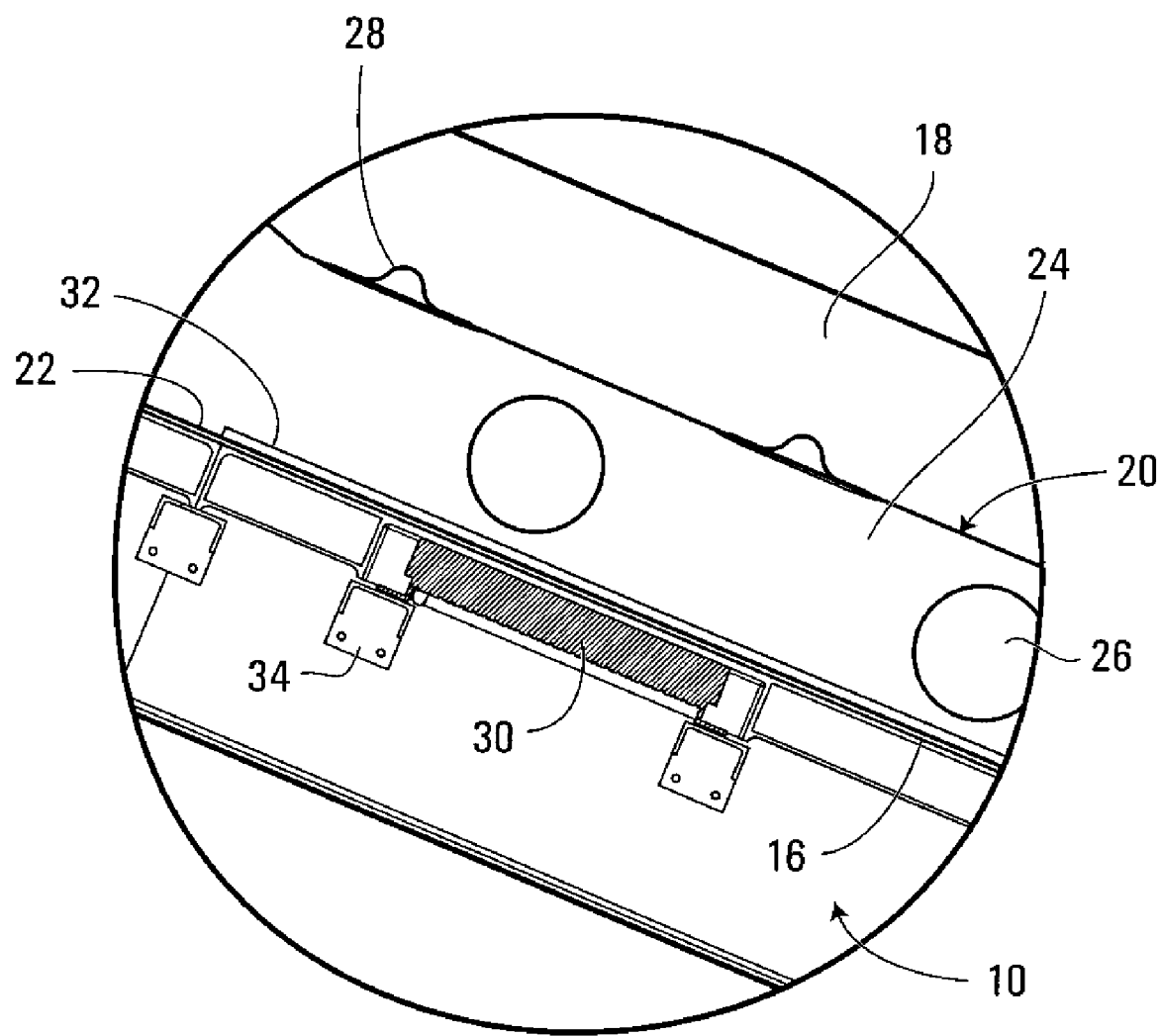
FIG. 3 is an enlarged side cross-sectional view of a portion of the uphill flume section of FIG. 1 with the vehicle sliding thereon.
Figure 4:
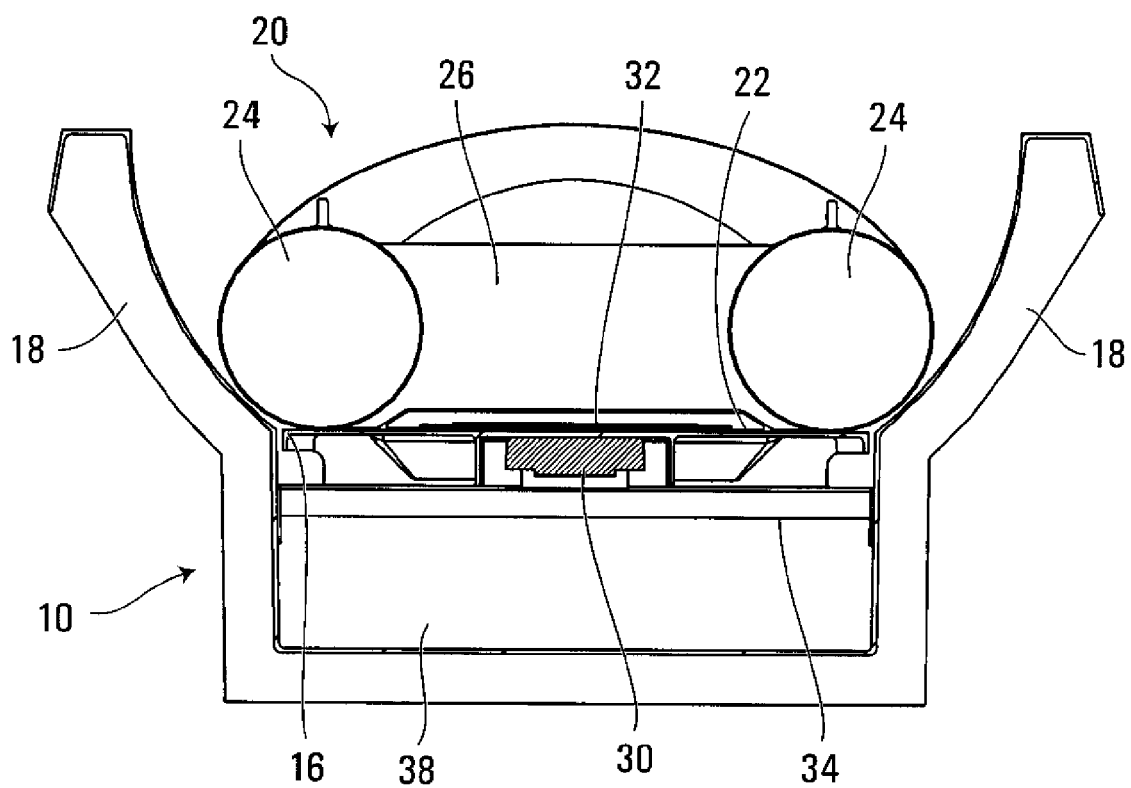
FIG. 4 is a cross-sectional end view of the portion of the uphill flume section shown in FIG. 1 with the vehicle sliding thereon.

As also seen in FIGS. 2-4, the flume 10 itself is generally comprised of the above-mentioned sliding surface 16 (removed in FIG. 1 to illustrates components therebeneath), as well as two side walls 18 (removed in FIG. 2 to show the vehicle 20). The sliding surface 16 is the surface on which the vehicle 20 slides, while the side walls 18 assist in ensuring that the vehicle 20 remains in the flume 10. The sliding surface 16 and side walls 18 may be made of any material providing sufficient toughness and rigidity, and may be smooth so as to permit easy sliding of the vehicle 20 thereon. In this embodiment, the sliding surface 16 and side walls 18 are made of fiberglass, and in particular a combination of neo-isothalic gelcoat, chop strand E-Glass or S-Glass fiber, woven roving and isothalic and orthothalic resins.

In this embodiment, the vehicle 20 is a raft adapted to carry one or more riders thereon and is provided at its bottom with a vehicle bottom surface 22 adapted to slide along the sliding surface 16 of the flume 10 during normal operation. The vehicle 20 in this embodiment has side tubes 24, thwarts 26 and handles 28.

Means are provided to impart a thrusting force to the vehicle 20 to assist it up the illustrated uphill section of the flume 10. Such a force is desirable for example where the speed of the vehicle 20 arriving at the entry end 12 of the illustrated section from other parts of the flume ride is not sufficient to propel the vehicle 20 to the exit end 14 of the illustrated section at a desired speed, on the basis of the vehicle's momentum alone. To provide the external force necessary to achieve the desired speed at the exit end 14 of the illustrated flume section 10, the illustrated flume section 10 has been provided with a linear motor.

There exist many types of linear motors, including linear induction motors (LIMs) and linear synchronous motors, suitable for the present application. The exemplary linear motor used in the illustrated embodiment is a squirrel cage style linear induction motor.

Conceptually, the linear induction motor of this embodiment is a standard rotary squirrel cage motor which has been opened out flat with the stator units lying in a spaced linear configuration and the rotor being replaced by a substantially flat reaction plate. In other embodiments, the rotor may be replaced by other elements, a curved reaction plate, an electromagnet, or a permanent magnet, for example. The units of the stator, known as linear induction motor units ("LIM units") when laid out flat, each comprise a 3 phase winding around a laminated iron core. When the LIM units are energized by an alternating current (AC) supply, a travelling wave magnetic field is produced. While a rotary motor effects rotary movement in a rotor, the flat stator of the linear induction motor effects linear movement in the reaction plate.

The reaction component or plate in such LIMs is typically a sheet of any electrically conductive metal, for example aluminum or copper. The conducting sheet may be backed by steel to provide return paths for the stator's magnetic flux. Currents induced in the reaction plate by the LIM units' travelling field create a secondary magnetic field. It is the reaction between these two magnetic fields which imparts the linear thrust to the reaction plate. The magnitude of the thrust imparted to the reaction plate is controlled largely by the voltage and frequency of the electrical supply to the LIM units (as supplied by an inverter, not shown) and the dimensions and materials of the reaction plate. Thrust of the LIM can be reversed if the polarity is changed on the LIM units.

In the context of a waterslide amusement ride, a LIM can control various aspects of the motion of a vehicle to which the reaction plate is affixed, depending on the configuration of the LIM units and the shape of the reaction plate. For example, the LIM can accelerate or decelerate the vehicle. It can also maintain the speed of the vehicle as it proceeds up an incline, or cause it to turn around corners. If the reaction plate is circular, it can also cause the vehicle to rotate.

In the exemplary embodiment shown in the FIGS. 1 to 4, the LIM units 30 are located under the sliding surface 16 of the flume 10 in spaced linear relationship in the direction of travel of the ride vehicle 20, and the reaction plate 32 is mounted at the bottom of the vehicle 20.

As shown in FIGS. 1 to 4, each LIM unit 30 of this embodiment is rectangular in shape and is substantially flat. In this embodiment, the dimensions of each LIM unit are 500 mm in length, 250 mm in width, and 85 mm in height and provides a thrust of 600 N at 480V, 60 Hz AC current and 20% duty cycle. Of course other dimensions, other voltages, other frequencies and other duty cycles may be used to provide a required thrust.

The LIM units 30 are mounted longitudinally to a flume frame 34 such that they are located just beneath the sliding surface 16 and substantially centered between the side walls 18. An upper surface of the LIM units 30 may alternatively form part of, or the entirety of the sliding surface 16. In either case, the functioning portions of the LIM units 30 are located beneath the sliding surface 16. In order to reduce cost, each LIM unit 30 is spaced from adjacent LIM units 30. In this embodiment, the LIM units 30 are spaced 571.5 mm apart. The LIM units 30 are electrically connected to a controlled power supply 36.

The reaction plate 32 is substantially flat and oblong in this embodiment. In other embodiments, other shapes of reaction plate 32 may be used, elliptical, round or square for example. In this embodiment the reaction plate 32 is a ⅛" sheet of 1050, 1100, 1200 or 5005 aluminum and a 3/32" sheet of A36 galvanized steel affixed above the sheet of aluminum. The reaction plate 32 is 72" in length and 18" in width, with the width of the steel sheet being 2" narrower than the aluminum sheet such that the aluminum sheet extends beyond the width of the steel sheet by 2" on each side. Examples of suitable reaction plates are detailed in a co-owned application entitled "Reaction Component for a Linear Induction Motor", filed concurrently with the present application and incorporated herein by reference in its entirety.

The reaction plate 32 is affixed at the bottom of the vehicle 20 and may be covered by the vehicle bottom surface 22 so as to provide a smooth interface between the vehicle bottom surface 22 and the flume sliding surface 16. The distance between the reaction plate 32 and the LIM units 30 may be minimized to increase the force imparted on the vehicle 20 by the LIM units 30. In this embodiment, the bottom surface 22 of the vehicle is made of vinyl rubber, and the gap between the reaction plate 32 and the LIM units 30 is about ⅜"-⅝", during operation. Other materials may be used for the vehicle bottom surface 22, fiberglass for example. The vehicle 20 may be loaded with a substantially even distribution of weight or with somewhat greater weight toward the rear of the vehicle 20 so as to try to maintain proximity between the vehicle bottom surface 22 and the sliding surface 16.

As shown in FIG. 1, the flume 10 is provided with support structures such that the sliding surface 16 is supported by the flume frame 34. A conduit 38 is provided below the sliding surface 16 to accommodate electrical wires (not shown) and to allow water seeping between the sliding surface 16 and the side walls 18 to flow downhill. All electrical elements are sealed and are double ground faulted to ensure safety.

The flume 10 in this embodiment is also provided with proximity sensors 40 upstream of the illustrated section, and also throughout the illustrated section such that the voltage and/or frequency of the electrical supply to the LIM units 30 can be varied as a function of the speed of the vehicle to ensure that the vehicle arrives at the exit end 14 of the illustrated section at the desired speed. Such proximity sensors may be, for example, inductive proximity detectors. One model of proximity sensor which may be used is Turck Weld Field Immune Proximity Sensor 1646631.

In operation, the illustrated flume section 10 is provided with water using any of a number of known means, for example recessed water jets located in the side walls, water flowing from a higher point in the flume, etc. The water provides lubrication between the bottom surface 22 of the vehicle and the sliding surface 16 of the flume 10 so as to facilitate movement of the vehicle 20 up the section. In this embodiment, the water layer on the sliding surface 16 is 1-3 mm in depth, though it is to be understood that other depths of water may be used.

Figure 5:
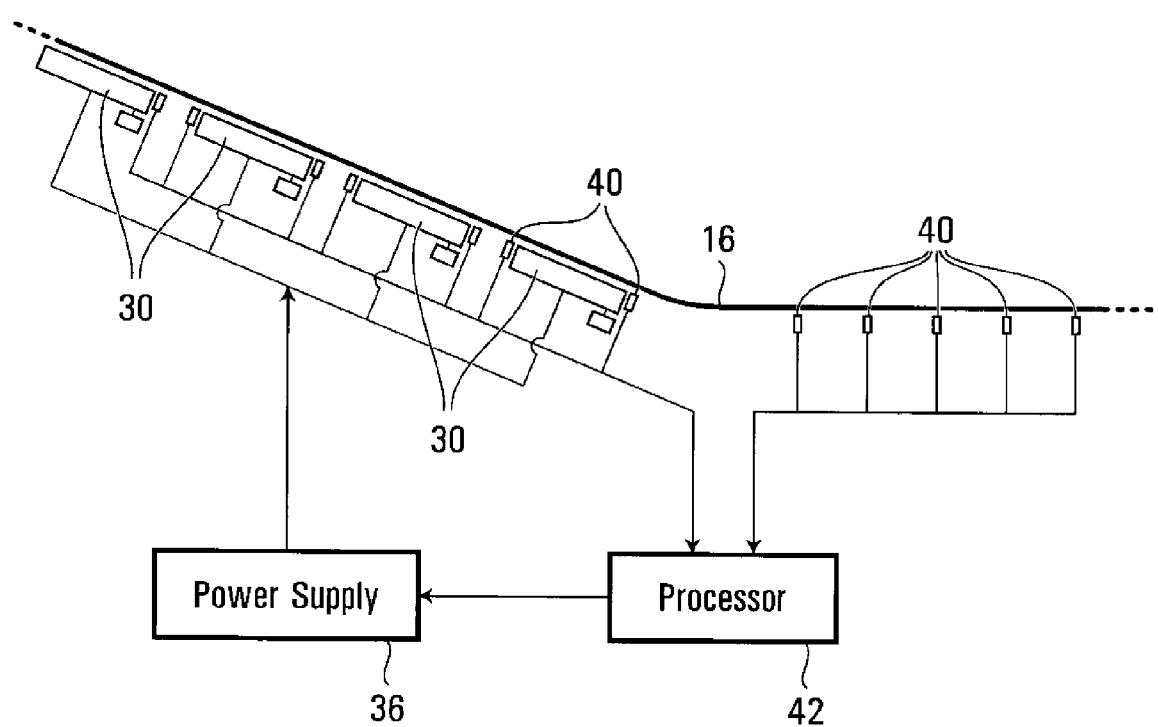
FIG. 5 is a schematic view of an exemplary control system for the uphill flume section of FIG. 1.

At the start of the ride, the vehicle 20 is launched from a launching station (not shown) of the flume and proceeds along the flume. As shown in FIG. 5, the LIM is controlled by a drive controller. In particular, as the vehicle 20 approaches the illustrated section, the proximity sensors 40 mounted upstream of the illustrated section detect the location of the vehicle 20 over time. This information is communicated to a processor 42 which calculates a speed of the vehicle, and further calculates voltages and frequencies to be supplied to the various LIM units 30 which would likely exert sufficient force to ensure that the vehicle 20 arrives at the exit end 14 of the illustrated flume section 10 at the desired speed. In order to improve the accuracy of this calculation, vehicle weight detectors (not shown) may also be utilized, possibly at the beginning of the ride The processor then causes the power supply 36 to supply this voltage and frequency to the LIM units 30 as necessary.

As the vehicle 20 mounts the illustrated flume section 10, the magnetic field generated by the LIM units 30 provides a linear thrust to the reaction plate 32 affixed to the bottom of the vehicle 20, causing the vehicle 20 to maintain its speed, or accelerate up the illustrated section 10. As the vehicle 20 proceeds up the illustrated section 10, the other proximity sensors 40 serve to monitor the speed of the vehicle 20 and the power supply to the LIM units 30 is adjusted accordingly. In this embodiment, the LIM units 30 are powered successively, one or two or three at a time to provide thrust to the vehicle 20 as needed.

While the proximity sensors 40 discussed above detect a position of the vehicle 20, other sensors could be used to measure one or more of position, linear speed, rotational speed, and direction of movement of the vehicle 20, and cause the LIM units 30 to operate so as to affect motion of the vehicle 20 in a desired manner, for example by decelerating the vehicle 20, slowing its rotation, or changing its direction of motion.

As described, the illustrated embodiment reduces the need for a direct contact outside force on the vehicle 20 to assist it up the incline, a feature which improves the safety of the ride while also increasing its rider comfort and aesthetic appeal.

While this embodiment has been described as an amusement ride feature, it is to be understood that the present invention also contemplates an amusement ride embodying such an amusement ride feature, a method of using a LIM to affect motion of a vehicle in an amusement ride, a ride vehicle having a reaction plate for use on a LIM-enabled ride, and a LIM-enabled sliding surface having LIM units mounted thereneath.

While this embodiment ride has been described as being a waterslide ride, it is to be understood that the present invention can be applied in non-water sliding amusement rides, including so-called dry rides. One example would be a ride in which a vehicle slides on a sliding surface having a low-friction coating such as TEFLON™.

Figure 6:
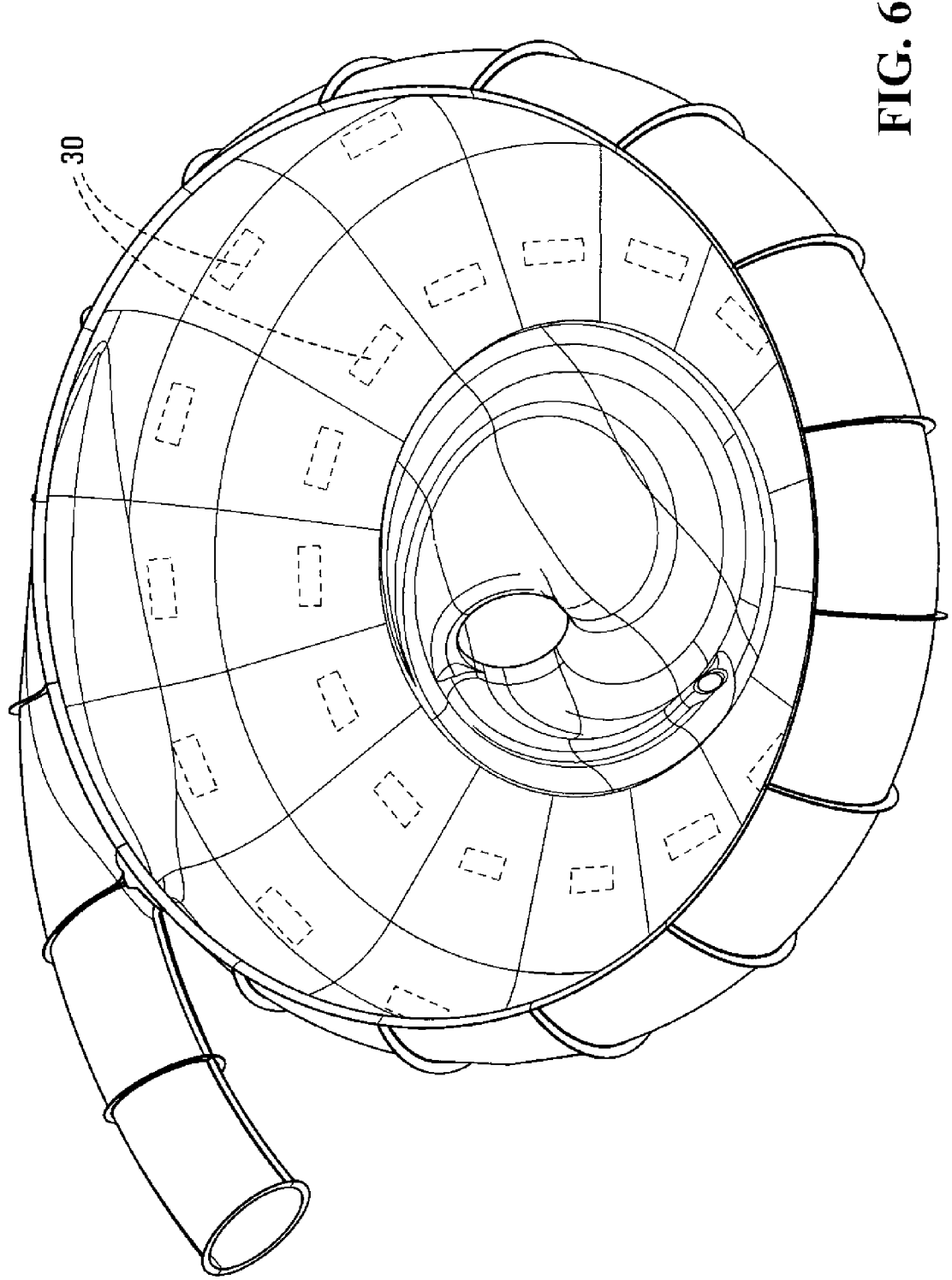
FIG. 6 is a perspective view of a bowl of a second embodiment of the present invention.
Figure 7:
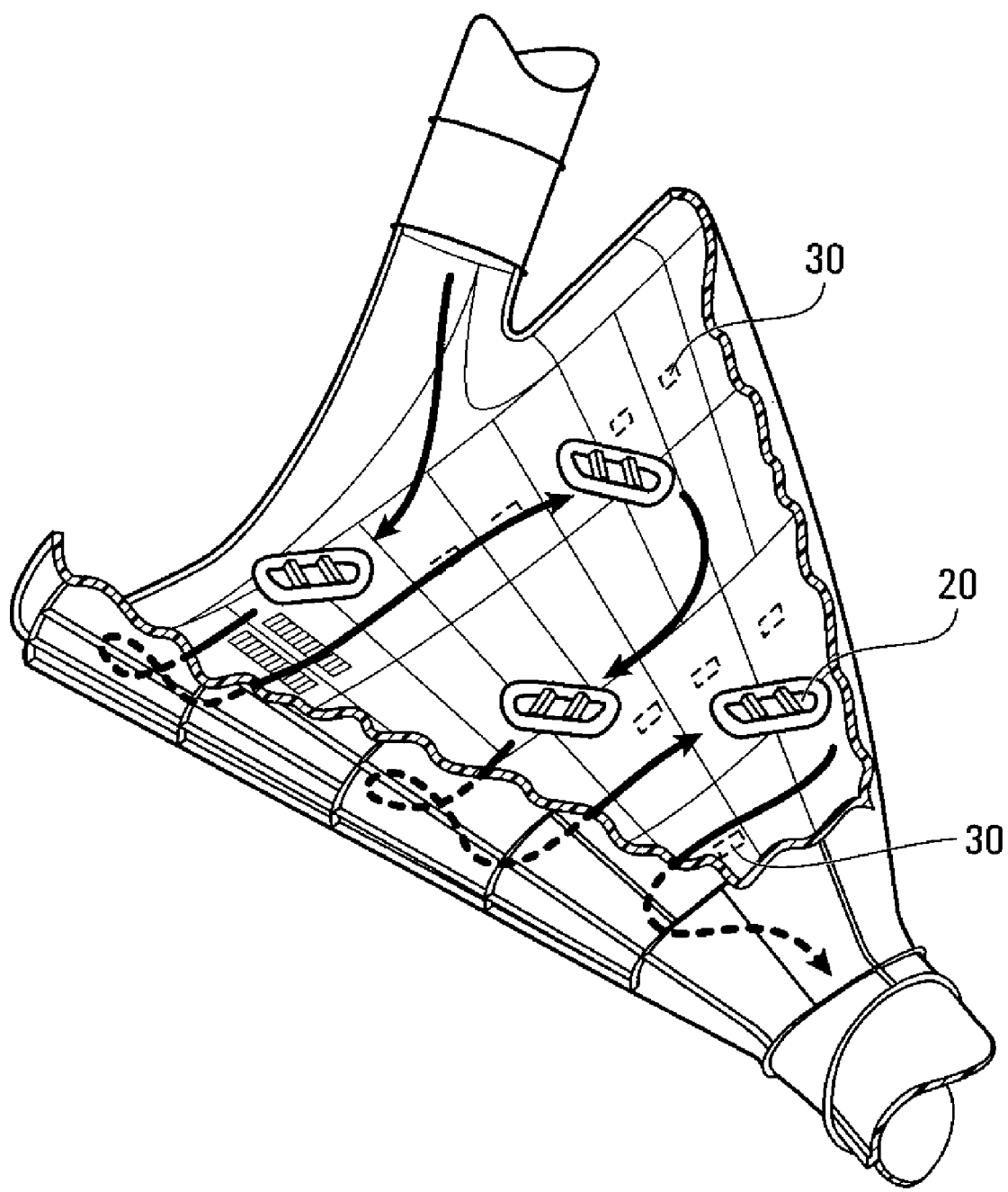
FIG. 7 is a perspective partial cut-away view of a funnel of a third embodiment of the present invention.

Further, although this embodiment has been described in detail in the context of a flume ride, it is to be understood that the present invention may also be applied to other types of sliding amusement rides. For example, FIG. 6 is an illustration of a bowl-style ride or ride feature in which LIM units 30 are embedded around the bowl so as to maintain a ride vehicle's motion around the bowl before it is released and allowed to corkscrew towards the middle. Such a bowl-style ride is described in U.S. Design Pat. No. D521,098, issued May 16, 2006, incorporated herein in its entirety. FIG. 7 illustrates a funnel-style ride or ride feature in which LIM units 30 are embedded along the sides so as to increase or decrease the amplitude with which the ride vehicle oscillates along the funnel. This funnel-style ride is a completed funnel turned on its side and in FIG. 7, an upper side portion of the funnel has been cut away for the sole purpose of showing interior features. Such a funnel ride is described in U.S. Pat. No. 6,857, 964 issued Feb. 22, 2005, U.S. Pat. No. 7,056,220 issued Jun. 6, 2006, and in co-pending U.S. application Ser. No. 11/381, 557 filed May 4, 2006, each of which is incorporated herein in its entirety. In an alternative embodiment flume ride feature illustrated in FIG. 8, the invention may be used to accelerate a ride vehicle up a straight incline followed by a curving incline.

While this embodiment has been described as being an uphill section in the middle of a ride, it will be understood that the present invention can be applied in other sections of an amusement ride. For example, the LIM units 30 may be embedded in a horizontal section at the launch station to accelerate the ride vehicle 20 and launch it into the ride. Alternatively, LIM units 30 may be embedded in an uphill section near the launch station so as to either take a ride vehicle 20 containing a rider to the top of a first hill, or to return an empty vehicle 20 to an elevated launch station. Further, LIM units 30 may be embedded at the end of a ride so as to slow down the vehicle 20 as it approaches the end of the ride, or the launch station. Indeed LIM units 30 may be embedded in downhill sections to control the rate of descent of the ride vehicle 20.

Figure 9:
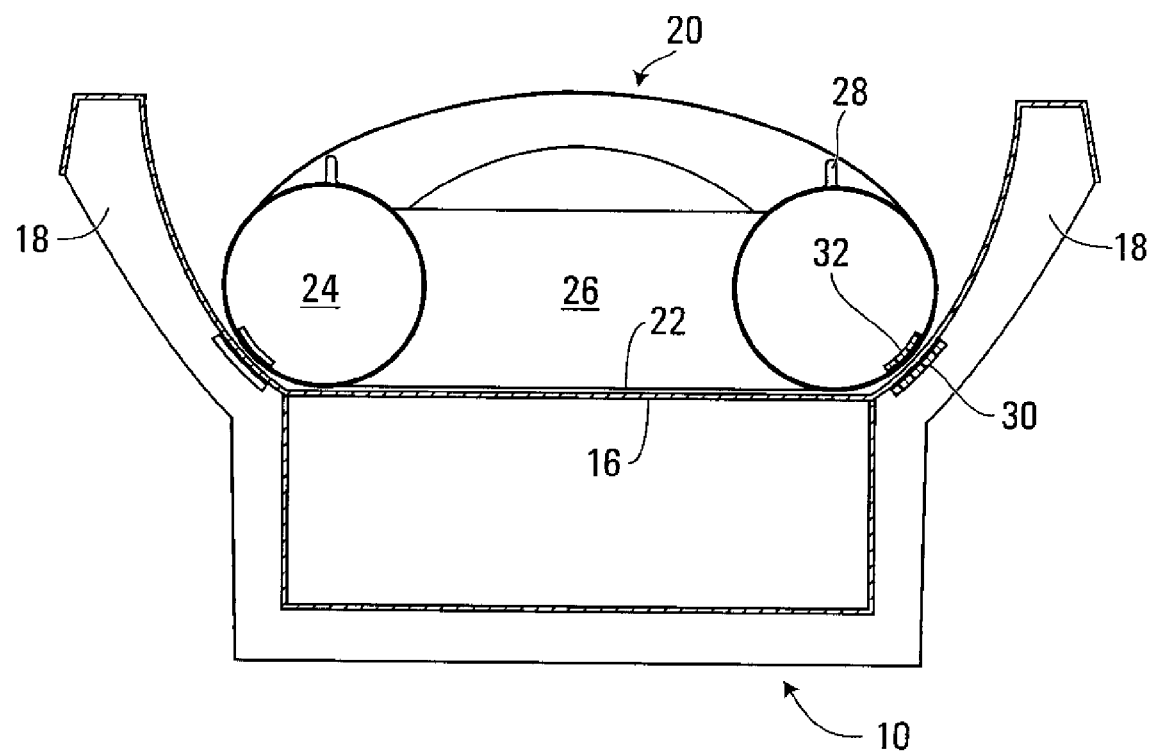
FIG. 9 is a cross-sectional end view of a fifth embodiment of the present invention.

Other modifications are possible. For example, instead of the ride vehicle 20 having only one reaction plate 32, it may have multiple reaction plates 32. Further, as illustrated in FIG. 9, instead of the LIM units 30 being mounted beneath the sliding surface 16 of the flume 10 and the reaction plate 32 being mounted at the bottom of the ride vehicle 20, the LIM units 30 may be mounted outside of and parallel to the side walls 18 of the flume 10 and the reaction plates 32 may be mounted to the ride vehicle 20 such that they are parallel to the side walls 18 of the flume when the ride vehicle 20 is in the flume 10.

Figure 8:
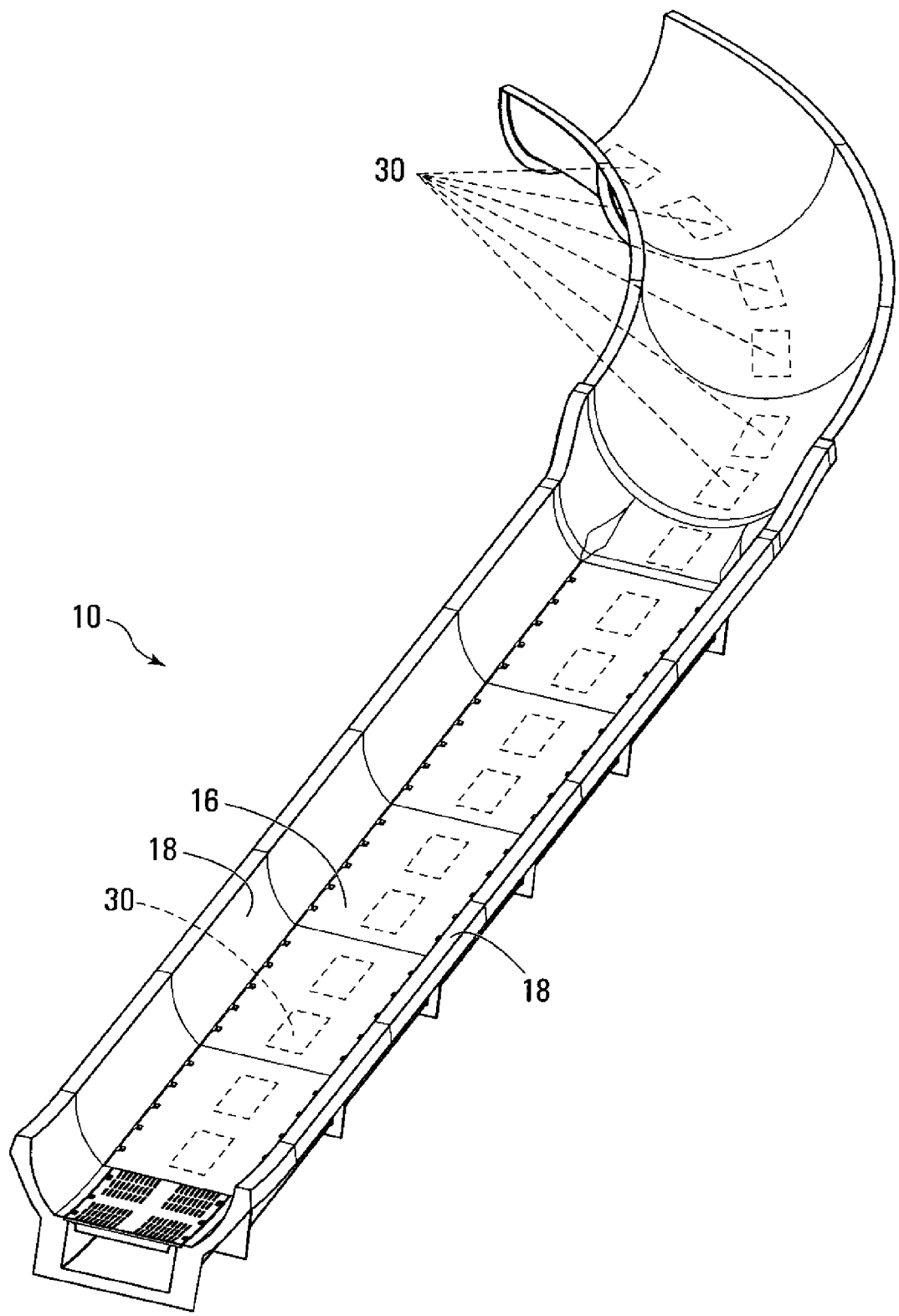
FIG. 8 is a perspective view of an uphill flume section of a fourth embodiment of the present invention.

It is to be understood that while the LIM in the illustrated embodiment is used to maintain the speed of, or to accelerate the ride vehicle 20, the LIM can also be used to impart other motion control to the vehicle 20. For example, the LIM can be used to decelerate the ride vehicle 20, resist acceleration of the ride vehicle 20 down a slope, or indeed to stop it or reverse its direction. Further, in other LIM unit 30 and reaction plate 32 configurations, the LIM can be used to cause the ride vehicle 20 to rotate. For example the linear motor force could be arranged off center so that a turning moment is created in the reaction plate 32. Alternatively, adjacent LIM units 30 could thrust in opposite directions to create the turning moment. Additionally, the selective operation of multiple LIM unit sets in angular relationship to each other can cause the ride vehicle 20 to selectively follow different trajectories. The LIM can also be used to cause or assist the ride vehicle 20 in going around corners. Of course, a combination of these motions can also be implemented, for example a LIM which causes the ride vehicle 20 to rotate as it decelerates, or a LIM which causes the ride vehicle 20 to accelerate as it goes around a corner, as shown in FIG. 8.

Figure 10:
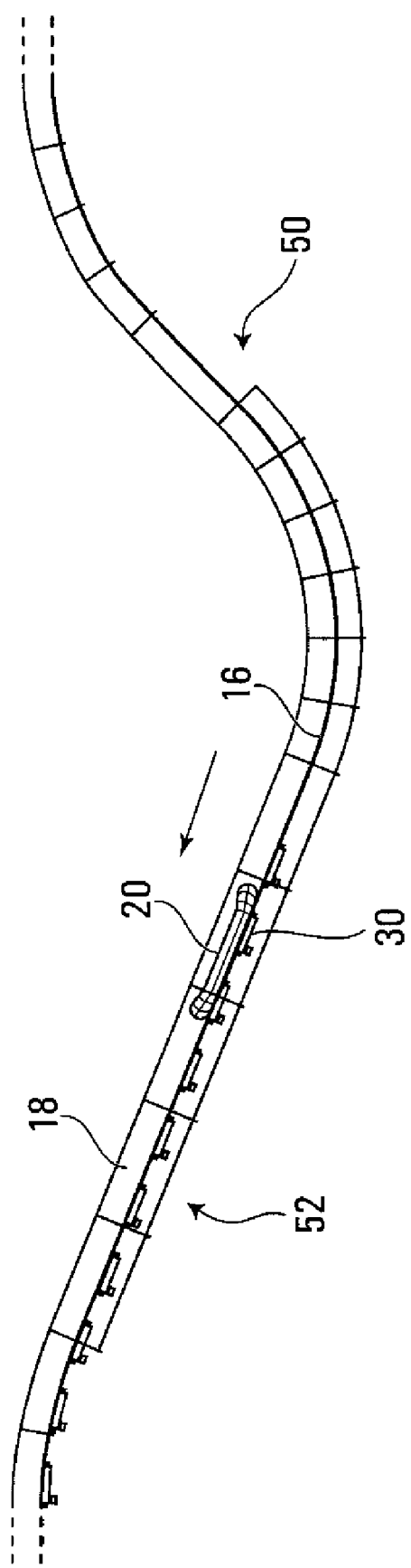
FIG. 10 is a side view of a flume ride feature in accordance with a method of the present invention.

Alternatively, as illustrated in FIG. 10, the LIM can be used to provide other ride motion. For example, in a ride feature comprising a downhill section 50 followed by an uphill section 52, as the vehicle 20 proceeds down the downhill section 50 and up the uphill section 52, the LIM may be operated such that the vehicle 20 reaches a certain height. The LIM may then be deactivated, causing the vehicle 20 to slide backwards down the uphill section 52 and up the downhill section 50. The vehicle 20 will then slide back down the downhill section 50 and up the uphill section 52 whereupon the LIM may be reactivated such that the vehicle 20 reaches the top of the uphill section 52 at a desired speed.

While the vehicle 20 in the illustrated embodiments has been illustrated as a flat-bottomed raft, it is to be understood that the vehicle 20 in accordance with the present invention can be any vehicle adapted to convey at least one rider in a sliding amusement ride, for example an inner-tube-style vehicle, a multi-rider vehicle, or a platform vehicle.

While the linear induction motor drive has been described in the illustrated embodiments as comprising linear induction motor units 30 embedded below the sliding surface 16 and the reaction plate 32 mounted at the bottom of the ride vehicle 20, it is to be understood that other suitable configurations are possible. For example, the linear induction motor units 30 may be mounted at the bottom of the ride vehicle 20 as powered by batteries and controlled remotely, with multiple reaction plates 32 mounted beneath the surface of the ride surface 16.

While the flume 10, the LIM units 30, the reaction plate 32, and other features have been described in some cases as having particular dimensions and being made of particular materials, it will be understood by persons skilled in the art that other dimensions and materials may be used without necessarily departing from the scope of the present invention.

Further, while the linear motor of the illustrated embodiments has been described as being a linear induction motor, it is to be understood that other types of linear motors may be used, linear synchronous motors, for example.

Finally, specific details of the particular LIM utilized in the illustrated embodiments of the invention have been provided in some cases. However, persons skilled in the art will understand that other types of LIMs having different configurations, specifications, and dimensions can be utilized without necessarily departing from the scope of the present invention.

Numerous modifications and variations of the present invention are possible in light of the above teachings. It is therefore to be understood that within the scope of the appended claims, the invention may be practised otherwise than as specifically described herein.

The invention claimed is:

1. An amusement ride feature comprising:
   a sliding surface;
   a vehicle adapted to slide on said sliding surface and to convey at least one rider thereon; and
   a linear motor associated with the vehicle and the sliding surface for affecting sliding motion of the vehicle on the sliding surface;
   wherein the linear motor is a linear induction motor; and
   wherein the linear motor comprises a plurality of linear induction motor units located beneath the sliding surface, and at least one reaction plate mounted near a bottom of said vehicle and substantially parallel thereto, said at least one reaction plate covered by a vehicle bottom surface which slides on the sliding surface.

2. The amusement ride feature of claim 1 wherein the sliding surface is a waterslide sliding surface.

3. An amusement ride feature comprising:
   a sliding surface;
   a vehicle adapted to slide on said sliding surface and to convey at least one rider thereon; and
   a linear motor associated with the vehicle and the sliding surface for affecting sliding motion of the vehicle on the sliding surface;
   wherein the linear motor is a linear induction motor;
   wherein the sliding surface is a waterslide sliding surface; and
   wherein said linear motor comprises at least one reaction plate mounted to said vehicle.

4. The amusement ride feature of claim 3 wherein said at least one reaction plate is mounted near a bottom of said vehicle and substantially parallel thereto.

5. The amusement ride feature of claim 4 wherein said at least one reaction plate is covered by a vehicle bottom surface which slides on the sliding surface.

6. The amusement ride feature of claim 5 wherein said linear motor further comprises a plurality of linear induction motor units located beneath the sliding surface.

7. The amusement ride feature of claim 6 further comprising sensors for detecting a vehicle parameter of the vehicle, said vehicle parameter comprising at least one of a linear speed, a rotational speed, a direction of movement, a weight and a position of the vehicle, and a controller for operating the linear motor as a function of the detected vehicle parameter of the vehicle.

8. The amusement ride feature of claim 3 wherein said linear motor further comprises a plurality of linear induction motor units located beneath the sliding surface.

9. The amusement ride feature of claim 3 further comprising sensors for detecting a vehicle parameter of the vehicle, said vehicle parameter comprising at least one of a linear speed, a rotational speed, a direction of movement, a weight and a position of the vehicle, and a controller for operating the linear motor as a function of the detected vehicle parameter of the vehicle.

10. The amusement ride feature of claim 3 wherein the linear motor is adapted to maintain a speed of the vehicle on the sliding surface.

11. The amusement ride feature of claim 3 wherein the linear motor is adapted to accelerate the vehicle on the sliding surface.

12. The amusement ride feature of claim 3 wherein the linear motor is adapted to decelerate the vehicle on the sliding surface.

13. The amusement ride feature of claim 3 wherein the linear motor is adapted to control a rotational speed of the vehicle on the sliding surface.

14. The amusement ride feature of claim 3 wherein the linear motor is adapted to change a direction of movement of the vehicle on the sliding surface.

15. The amusement ride feature of claim 3 wherein the ride feature is flume-style, the sliding surface is a bottom surface of a water flume, and said vehicle is adapted to convey said at least one rider along said water flume.

16. The amusement ride feature of claim 15 further comprising sensors for detecting a vehicle parameter of the vehicle, said vehicle parameter comprising at least one of a linear speed, a rotational speed, a direction of movement, a weight and a position of the vehicle, and a controller for operating the linear motor as a function of the detected vehicle parameter of the vehicle.

17. The amusement ride feature of claim 16 wherein said sensors are provided upstream of, and along a linear motor portion of the flume bearing the linear motor, said sensors adapted to detect a linear speed of the vehicle as it approaches the linear motor portion and while it is in said linear motor portion, and said controller is adapted to control the linear motor as a function of the detected speed to achieve a predetermined desired speed of the vehicle as it exits the linear motor portion.

18. The amusement ride feature of claim 15 wherein the linear motor is adapted to maintain a speed of the vehicle in the flume.

19. The amusement ride feature of claim 15 wherein the linear motor is adapted to maintain the speed of the vehicle in an uphill portion of the flume.

20. The amusement ride feature of claim 15 wherein the linear motor is adapted to accelerate the vehicle in the flume.

21. The amusement ride feature of claim 15 wherein the linear motor is adapted to decelerate the vehicle in the flume.

22. The amusement ride feature of claim 15 wherein the linear motor is adapted to control a rotational speed of the vehicle in the flume.

23. The amusement ride feature of claim 15 wherein the linear motor is adapted to change a direction of movement of the vehicle in the flume.

24. An amusement ride feature comprising:
a sliding surface;
a vehicle adapted to slide on said sliding surface and to convey at least one rider thereon; and
a linear motor associated with the vehicle and the sliding surface for affecting sliding motion of the vehicle on the sliding surface;
wherein the linear motor is a linear induction motor;
wherein the ride feature is flume-style, the sliding surface is a bottom surface of a water flume, and said vehicle is adapted to convey said at least one rider along said water flume; and
wherein the linear motor comprises a plurality of linear induction motor units located beneath the sliding surface along the flume, and at least one reaction plate mounted near a bottom of said vehicle and substantially parallel thereto, said at least one reaction plate covered by a vehicle bottom surface which slides on the sliding surface.

25. An amusement ride feature comprising:
a sliding surface;
a vehicle adapted to slide on said sliding surface and to convey at least one rider thereon; and
a linear motor associated with the vehicle and the sliding surface for affecting sliding motion of the vehicle on the sliding surface;
wherein the linear motor is a linear induction motor;
wherein the ride feature is flume-style, the sliding surface is a bottom surface of a water flume, and said vehicle is adapted to convey said at least one rider along said water flume; and
wherein said linear motor comprises at least one reaction plate mounted to said vehicle.

26. The amusement ride feature of claim 25 wherein said at least one reaction plate is mounted near a bottom of said vehicle and substantially parallel thereto.

27. The amusement ride feature of claim 26 wherein said at least one reaction plate is covered by a vehicle bottom surface which slides on the sliding surface.

28. The amusement ride feature of claim 27 wherein said linear motor further comprises a plurality of linear induction motor units located beneath the sliding surface along said flume.

29. The amusement ride feature of claim 28 further comprising sensors for detecting a vehicle parameter of the vehicle, said vehicle parameter comprising at least one of a linear speed, a rotational speed, a direction of movement, a weight and a position of the vehicle, and a controller for operating the linear motor as a function of the detected vehicle parameter of the vehicle.

30. The amusement ride feature of claim 25 wherein said linear motor further comprises a plurality of linear induction motor units located beneath the sliding surface along said flume.

31. The amusement ride feature of claim 25 wherein said at least one reaction plate is mounted on a side of said vehicle and substantially parallel thereto, and wherein said linear motor further comprises a plurality of linear induction motor units mounted on a side surface of said flume.

32. An amusement ride which includes a feature comprising:
a sliding surface;
a vehicle adapted to slide on said sliding surface and to convey at least one rider thereon; and
a linear motor associated with the vehicle and the sliding surface for affecting sliding motion of the vehicle on the sliding surface;
wherein the linear motor is a linear induction motor; and wherein the linear motor comprises a plurality of linear induction motor units located beneath the sliding surface, and at least one reaction plate mounted near a bottom of said vehicle and substantially parallel thereto, said at least one reaction plate covered by a vehicle bottom surface which slides on the sliding surface.

33. The amusement ride of claim 32 wherein the sliding surface is a waterslide sliding surface.

34. The amusement ride of claim 32 wherein the feature is flume-style, the sliding surface is a bottom surface of a water flume, and said vehicle is adapted to convey said at least one rider along said water flume.

35. A method of controlling the sliding motion of a vehicle sliding on a sliding surface in an amusement ride, comprising operating a linear motor associated with the vehicle and the sliding surface wherein the linear motor comprises a plurality of linear induction motor units located beneath the sliding surface, and at least one reaction plate mounted near a bottom of said vehicle and substantially parallel thereto, said at least one reaction plate covered by a vehicle bottom surface which slides on the sliding surface, and said operating of said linear motor comprises energizing the linear induction motor units to create a magnetic field which imparts a lateral force on the reaction plate.

36. The method of claim 35 wherein the sliding surface is a waterslide sliding surface.

37. The method of claim 35 wherein the ride feature is flume-style, the sliding surface is a bottom surface of a water flume, and said vehicle conveys said at least one rider along said water flume.

38. The method of claim 37 wherein the sliding surface is a waterslide sliding surface.

39. A method of controlling the sliding motion of a vehicle sliding on a sliding surface in an amusement ride, comprising:
providing the sliding surface;
placing the vehicle on the sliding surface; and
operating a linear motor associated with the vehicle and the sliding surface;
wherein the linear motor is a linear induction motor;
wherein the sliding surface is a waterslide sliding surface; and
wherein said linear motor comprises at least one reaction plate mounted to said vehicle.

40. The method of claim 39 wherein said at least one reaction plate is mounted near a bottom of said vehicle and substantially parallel thereto.

41. The method of claim 40 wherein said at least one reaction plate is covered by a vehicle bottom surface which slides on the sliding surface.

42. The method of claim 41 wherein said linear motor further comprises a plurality of linear induction motor units located beneath the sliding surface, and said operating of said linear motor comprises energizing the linear induction motor units to create a magnetic field which imparts a lateral force on the reaction plate.

43. The method of claim 42 further comprising:
providing sensors for detecting a vehicle parameter of the vehicle, said vehicle parameter comprising at least one of a linear speed, a rotational speed, a direction of movement, a weight and a position of the vehicle;
providing a controller for operating the linear motor as a function of the detected vehicle parameter of the vehicle; and
operating the controller to operate the linear motor as a function of the detected vehicle parameter of the vehicle.

44. The method of claim 39 wherein said linear motor further comprises a plurality of linear induction motor units located beneath the sliding surface, and said operating of said linear motor comprises energizing the linear induction motor units to create a magnetic field which imparts a lateral force on the reaction plate.

45. The method of claim 44 wherein the linear motor is operated to maintain a speed of the vehicle on the sliding surface.

46. The method of claim 44 wherein the linear motor is operated to accelerate the vehicle on the sliding surface.

47. The method of claim 44 wherein the linear motor is operated to decelerate the vehicle on the sliding surface.

48. The method of claim 44 wherein the linear motor is operated to control a rotational speed of the vehicle on the sliding surface.

49. The method of claim 44 wherein the linear motor is operated to change a direction of movement of the vehicle on the sliding surface.

50. The method of claim 39 further comprising:
providing sensors for detecting a vehicle parameter of the vehicle, said vehicle parameter comprising at least one of a linear speed, a rotational speed, a direction of movement, a weight and a position of the vehicle;
providing a controller for operating the linear motor; and
operating the controller to operate the linear motor as a function of the detected vehicle parameter of the vehicle.

51. An amusement ride feature comprising:
a sliding surface;
a vehicle adapted to slide on said sliding surface and to convey at least one rider thereon; and
a linear motor associated with the vehicle and the sliding surface for affecting sliding motion of the vehicle on the sliding surface;
wherein the linear motor is a linear induction motor; and
wherein the linear motor comprises a plurality of linear induction motor units located beneath the sliding surface, and at least one electromagnet mounted near a bottom of said vehicle.

52. An amusement ride feature comprising:
a sliding surface;
a vehicle adapted to slide on said sliding surface and to convey at least one rider thereon; and
a linear motor associated with the vehicle and the sliding surface for affecting sliding motion of the vehicle on the sliding surface;
wherein the linear motor is a linear induction motor; and
wherein the linear motor comprises a plurality of linear induction motor units located beneath the sliding surface, and at least one permanent magnet mounted near a bottom of said vehicle.

* * * * *

UNITED STATES PATENT AND TRADEMARK OFFICE
CERTIFICATE OF CORRECTION

| | | |
|---|---|---|
| PATENT NO. | : 8,038,542 C1 | Page 1 of 1 |
| APPLICATION NO. | : 95/002416 | |
| DATED | : April 28, 2014 | |
| INVENTOR(S) | : Richard D. Hunter et al. | |

It is certified that error appears in the above-identified patent and that said Letters Patent is hereby corrected as shown below:

In the Claims

Claim 25, Col. 2, Line 53, "waterslide l" should read as --waterslide--.

Claim 55, Col. 4, Line 50, "waterside" should read as --waterslide--.

Claim 56, Col. 4, Line 53, "the" should read as --The--.

Claim 58, Col. 4, Line 60, "waterslide surface" should read as --waterslide sliding surface--.

Signed and Sealed this
Nineteenth Day of August, 2014

Michelle K. Lee
*Deputy Director of the United States Patent and Trademark Office*

ып
INTER PARTES REEXAMINATION CERTIFICATE (866th)
United States Patent
Hunter et al.

(10) Number: US 8,038,542 C1
(45) Certificate Issued: Apr. 28, 2014

(54) LINEAR MOTOR DRIVEN AMUSEMENT RIDE AND METHOD

(75) Inventors: Richard D. Hunter, Ottawa (CA); Andreas Tanzer, Gatineau (CA)

(73) Assignee: HM Attractions Inc., Ottawa (CA)

Reexamination Request:
No. 95/002,416, Sep. 15, 2012

Reexamination Certificate for:
Patent No.: 8,038,542
Issued: Oct. 18, 2011
Appl. No.: 11/681,712
Filed: Mar. 2, 2007

Related U.S. Application Data

(60) Provisional application No. 60/778,384, filed on Mar. 3, 2006.

(51) Int. Cl.
*A63G 21/18* (2006.01)
*A63G 21/00* (2006.01)

(52) U.S. Cl.
USPC ............... 472/117; 472/13; 472/129; 104/69

(58) Field of Classification Search
None
See application file for complete search history.

(56) References Cited

To view the complete listing of prior art documents cited during the proceeding for Reexamination Control Number 95/002,416, please refer to the USPTO's public Patent Application Information Retrieval (PAIR) system under the Display References tab.

*Primary Examiner* — Jimmy G. Foster

(57) ABSTRACT

A waterslide amusement ride having in a portion thereof, a linear induction motor to efficiently and effectively affect the motion of a vehicle sliding on the ride. The linear induction motor comprises linear induction motor units embedded below a sliding surface, and a reaction plate mounted to the bottom of the vehicle. Depending on the configuration of the linear induction motor units and the reaction plate, the linear induction motor drive can be used to accelerate the vehicle, decelerate the vehicle, maintain the speed of the vehicle up an uphill section, or rotate the vehicle.

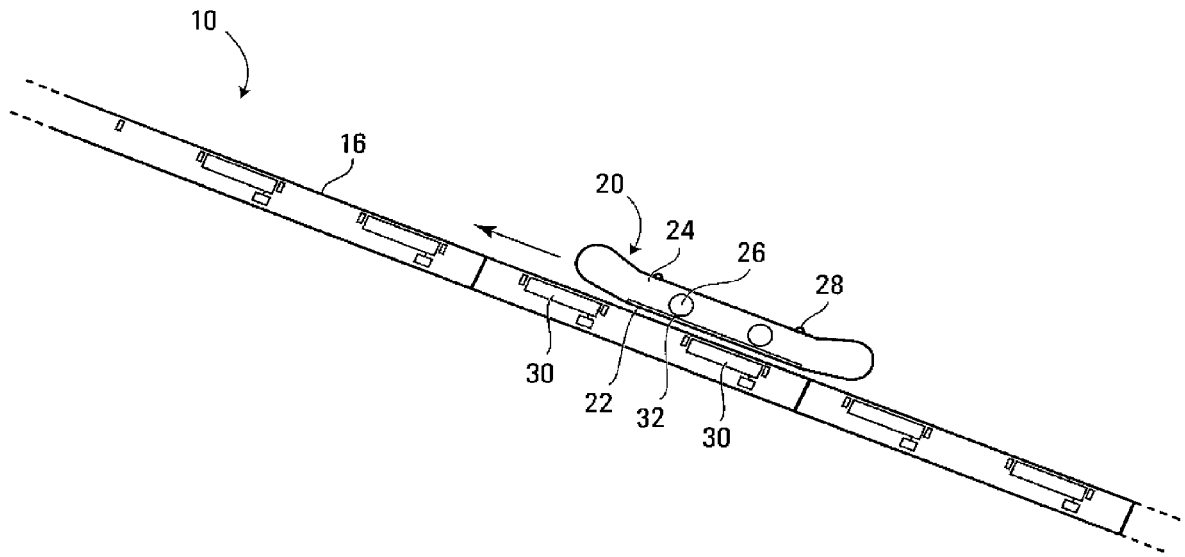

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 7, 9, 15, 18-23, 33, 34, 36-38, 43 and 50 are cancelled.

Claims 1, 3, 4, 8, 10-14, 16, 24, 25, 32, 35, 39 and 51 are determined to be patentable as amended.

Claims 5, 6, 17, 26-31, 40-42 and 44-49, dependent on an amended claim, are determined to be patentable.

New claims 53-96 are added and determined to be patentable.

Claim 52 was not reexamined.

1. [An] *A waterslide* amusement ride feature comprising:
a *waterslide* sliding surface;
a vehicle adapted to slide on said sliding surface and to convey at least one rider thereon; and
a linear motor associated with the vehicle and the sliding surface for affecting sliding motion of the vehicle on the sliding surface;
wherein the linear motor is a linear induction motor; and
wherein the linear motor comprises a plurality of linear induction motor units located beneath the sliding surface, and at least one reaction plate mounted near a bottom of said vehicle and substantially parallel thereto, said at least one reaction plate covered by a vehicle bottom surface which slides on the sliding surface*;*
*wherein a pair of side walls extend upward from the waterslide sliding surface, each side wall having a height; and wherein the waterslide sliding surface is configured such that when the vehicle slides on the waterslide sliding surface, the at least one rider is at least partially below the height of each side wall.*

3. An amusement ride feature comprising:
a sliding surface;
a vehicle adapted to slide on said sliding surface and to convey at least one rider thereon; and
a linear motor associated with the vehicle and the sliding surface for affecting sliding motion of the vehicle on the sliding surface;
wherein the linear motor is a linear induction motor;
wherein the sliding surface is a waterslide sliding surface; [and]
wherein said linear motor comprises at least one reaction plate mounted to said vehicle*;*
*wherein the linear induction motor propels the vehicle as the vehicle slides on the sliding surface; and*
*wherein the ride feature is flume-style, the sliding surface is a bottom surface of a water flume, and said vehicle is adapted to convey said at least one rider within said water flume.*

4. The amusement ride feature of claim [3] *94* wherein said at least one reaction plate is mounted near a bottom of said vehicle and substantially parallel thereto.

8. The amusement ride feature of claim [3] *94* wherein said linear motor further comprises a plurality of linear induction motor units located beneath the sliding surface.

10. The amusement ride feature of claim [3] *94* wherein the linear motor is *further* adapted to maintain a speed of the vehicle on the sliding surface.

11. The amusement ride feature of claim [3] *94* wherein the linear motor is *further* adapted to accelerate the vehicle on the sliding surface.

12. The amusement ride feature of claim [3] *94* wherein the linear motor is *further* adapted to decelerate the vehicle on the sliding surface.

13. The amusement ride feature of claim [3] *94* wherein the linear motor is *further* adapted to control a rotational speed of the vehicle on the sliding surface.

14. The amusement ride feature of claim [3] *94* wherein the linear motor is *further* adapted to change a direction of movement of the vehicle on the sliding surface.

16. The amusement ride feature of claim [15] *3* further comprising sensors for detecting a vehicle parameter of the vehicle, said vehicle parameter comprising at least one of a linear speed, a rotational speed, a direction of movement, a weight and a position of the vehicle, and a controller for operating the linear motor as a function of the detected vehicle parameter of the vehicle.

24. [An] *A waterslide* amusement ride feature comprising:
a *waterslide* sliding surface;
a vehicle adapted to slide on said sliding surface and to convey at least one rider thereon; and
a linear motor associated with the vehicle and the sliding surface for affecting sliding motion of the vehicle on the sliding surface;
wherein the linear motor is a linear induction motor;
wherein the ride feature is flume-style, the sliding surface is a bottom surface of a water flume, and said vehicle is adapted to convey said at least one rider along said water flume; [and]
wherein the linear motor comprises a plurality of linear induction motor units located beneath the sliding surface along the flume, and at least one reaction plate mounted near a bottom of said vehicle and substantially parallel thereto, said at least one reaction plate covered by a vehicle bottom surface which slides on the sliding surface*;*
*wherein a pair of side walls extend upward from the bottom surface of the water flume, each side wall having a height;*
*wherein the waterslide sliding surface is configured such that when the vehicle slides on the bottom surface of the water flume, the at least one rider is at least partially below the height of each side wall; and*
*wherein said vehicle is a raft.*

25. [An] *A waterslide l* amusement ride feature comprising:
a *waterslide* sliding surface;
a vehicle adapted to slide on said sliding surface and to convey at least one rider thereon; and
a linear motor associated with the vehicle and the sliding surface for affecting sliding motion of the vehicle on the sliding surface;
wherein the linear motor is a linear induction motor;
wherein the ride feature is flume-style, the sliding surface is a bottom surface of a water flume, and said vehicle is adapted to convey said at least one rider along said water flume; [and]
wherein said linear motor comprises at least one reaction plate mounted to said vehicle*; and*

*wherein the waterslide sliding surface is configured such that when the vehicle slides on the bottom surface of the water flume, the vehicle is substantially within the water flume.*

32. [An] *A waterslide* amusement ride which includes a feature comprising:
 a *waterslide* sliding surface;
 a vehicle adapted to slide on said sliding surface and to convey at least one rider thereon; and
 a linear motor associated with the vehicle and the sliding surface for affecting sliding motion of the vehicle on the sliding surface;
 wherein the linear motor is a linear induction motor; [and]
 wherein the linear motor comprises a plurality of linear induction motor units located beneath the sliding surface, and at least one reaction plate mounted near a bottom of said vehicle and substantially parallel thereto, said at least one reaction plate covered by a vehicle bottom surface which slides on the sliding surface*;*
 *wherein the feature is a water flume having contours, the sliding surface is a bottom surface of the water flume, and said vehicle is adapted to convey said at least one rider within said water flume;*
 *wherein said waterslide amusement ride includes at least one uphill section and one downhill section; and*
 *wherein movement of said vehicle in said downhill section is controlled predominantly by the contours of the water flume in combination with gravity.*

35. A method of controlling the sliding motion of a vehicle sliding on a *waterslide* sliding surface in [an] *a waterslide* amusement ride, comprising operating a linear motor associated with the vehicle and the sliding surface wherein the linear motor comprises a plurality of linear induction motor units located beneath the sliding surface, and at least one reaction plate mounted near a bottom of said vehicle and substantially parallel thereto, said at least one reaction plate covered by a vehicle bottom surface which slides on the sliding surface, and said operating of said linear motor comprises energizing the linear induction motor units to create a magnetic field which imparts a lateral force on the reaction plate*;*
 *wherein the waterslide amusement ride is flume-style, the sliding surface is a bottom surface of a water flume, and said vehicle conveys at least one rider along said water flume;*
 *wherein a pair of side walls extend upward from the bottom surface of the water flume, each side wall having a height;*
 *wherein the waterslide sliding surface is configured such that when the vehicle slides on the waterslide sliding surface, the vehicle is substantially below the height of each side wall;*
 *wherein said water flume has contours and includes at least one uphill section and one downhill section; and*
 *wherein the movement of said vehicle in said downhill section is controlled predominantly by the contours of the water flume in combination with gravity.*

39. A method of controlling the sliding motion of a vehicle sliding on a sliding surface in [an] *a waterslide* amusement ride, comprising:
 providing the sliding surface;
 placing the vehicle on the sliding surface; and
 operating a linear motor associated with the vehicle and the sliding surface *to propel the vehicle as the vehicle slides on the sliding surface*;
 wherein the linear motor is a linear induction motor;
 wherein the sliding surface is a waterslide sliding surface; [and]
 wherein said linear motor comprises at least one reaction plate mounted to said vehicle*; and*
 *wherein the waterslide amusement ride is flume-style, the sliding surface is a bottom surface of a water flume, and said vehicle conveys at least one rider within said water flume; and*
 *the method further comprising providing sensors for detecting a vehicle parameter of the vehicle, said vehicle parameter comprising at least one of a linear speed, a rotational speed, a direction of movement, a weight and a position of the vehicle; providing a controller for operating the linear motor as a function of the detected vehicle parameter of the vehicle; and operating the controller to operate the linear motor as a function of the detected vehicle parameter of the vehicle.*

51. [An] *A flume-style waterslide* amusement ride feature comprising:
 a water flume having contours including least one uphill section and one downhill section;
 the water flume comprising a sliding surface;
 a [vehicle] *raft* adapted to slide *within said water flume and* on said sliding surface and to convey at least one rider thereon; [and]
 a linear motor associated with the [vehicle] *raft* and the sliding surface for affecting sliding motion of the [vehicle] *raft* on the sliding surface;
 wherein the linear motor is a linear induction motor; [and]
 wherein the linear motor comprises a plurality of linear induction motor units located beneath the sliding surface, and at least one electromagnet mounted near a bottom of [said vehicle] *the raft;*
 *wherein the motion of the raft in said uphill section of the water flume is controlled at least in part by said linear induction motor; and*
 *wherein the motion of the raft in said downhill section of the water flume is controlled predominantly by the contours of the water flume in combination with gravity.*

53. The waterslide amusement ride feature of claim 1, wherein the waterslide sliding surface is configured such that when the vehicle slides on the waterslide sliding surface, the vehicle is substantially below the height of each side wall.

54. The waterslide amusement ride feature of claim 1, wherein the waterslide sliding surface is configured such that when the vehicle slides on the waterslide sliding surface, the vehicle is substantially between the pair of side walls.

55. The waterslide amusement ride feature of claim 1, wherein the vehicle has a width and the waterside sliding surface has a width and said sliding surface width is greater than said vehicle width.

56. the waterslide amusement ride feature of claim 1, wherein the vehicle is a raft.

57. The waterslide amusement ride feature of claim 1, wherein the vehicle is an inner-tube style vehicle.

58. The waterslide amusement ride feature of claim 1, wherein at least one side wall of the pair of side walls includes at least one spray nozzle configured to supply water lubricant on the waterslide surface.

59. The waterslide amusement ride feature of claim 1, wherein said waterslide amusement ride has contours and includes at least one uphill section and one downhill section.

60. The waterslide amusement ride feature of claim 59, wherein the movement of said vehicle in said downhill section is controlled predominantly by the contours of the waterslide amusement ride in combination with gravity.

61. The waterslide amusement ride feature of claim 1, wherein the waterslide sliding surface descends into a splash pool.

62. The amusement ride feature of claim 94, wherein a pair of side walls extend upward from the bottom surface of the water flume, each side wall having a height; and
   wherein the waterslide sliding surface is configured such that when the vehicle slides on the bottom surface of the water flume, the at least one rider is at least partially below the height of each side wall.

63. The amusement ride feature of claim 94, wherein a pair of side walls extend upward from the bottom surface of the water flume, each side wall having a height; and
   wherein the waterslide sliding surface is configured such that when the vehicle slides on the bottom surface of the water flume, the vehicle is substantially below the height of each side wall.

64. The amusement ride feature of claim 94, wherein a pair of side walls extend upward from the bottom surface of the water flume; and
   wherein the waterslide sliding surface is configured such that when the vehicle slides on the bottom surface of the water flume, the vehicle is substantially between the pair of side walls.

65. The amusement ride feature of claim 94, wherein the vehicle has a width and the waterslide sliding surface has a width and said sliding surface width is greater than said vehicle width.

66. The amusement ride feature of claim 94, wherein the vehicle is a raft.

67. The amusement ride feature of claim 94, wherein the vehicle is an inner-tube style vehicle.

68. The amusement ride feature of claim 94, wherein said water flume has contours and includes at least one uphill section and one downhill section.

69. The amusement ride feature of claim 68, wherein the movement of said vehicle in said downhill section is controlled predominantly by the contour of the water flume in combination with gravity.

70. The waterslide amusement ride feature of claim 94, wherein a pair of side walls extend upward from the bottom surface of the water flume; and
   wherein at least one side wall of the pair of side walls includes at least one spray nozzle configured to supply water lubricant on the waterslide sliding surface.

71. The waterslide amusement ride feature of claim 94, wherein the water flume descends into a splash pool.

72. The waterslide amusement ride feature of claim 25, wherein the vehicle has a width and the waterslide sliding surface has a width and said sliding surface width is greater than said vehicle width.

73. The waterslide amusement ride feature of claim 25, wherein a pair of side walls extend upward from the bottom surface of the water flume; and
   wherein at least one side wall of the pair of side walls includes at least one spray nozzle configured to supply water lubricant on the waterslide sliding surface.

74. The waterslide amusement ride feature of claim 25, wherein the water flume descends into a splash pool.

75. The waterslide amusement ride feature of claim 25, wherein the vehicle is a raft.

76. The waterslide amusement ride feature of claim 25, wherein the vehicle is an inner-tube style vehicle.

77. The waterslide amusement ride feature of claim 32, wherein a pair of side walls extend upward from the bottom surface of the water flume, each side wall having a height; and
   wherein the waterslide sliding surface is configured such that when the vehicle slides on the bottom surface of the water flume, the at least one rider is at least partially below the height of each side wall.

78. The waterslide amusement ride feature of claim 32, wherein a pair of side walls extend upward from the bottom surface of the water flume, each side wall having a height; and
   wherein the waterslide sliding surface is configured such that when the vehicle slides on the bottom surface of the water flume, the vehicle is substantially below the height of each side wall.

79. The waterslide amusement ride feature of claim 32, wherein the waterslide sliding surface is configured such that when the vehicle slides on the bottom surface of the water flume, the vehicle is substantially within the water flume.

80. The waterslide amusement ride feature of claim 32, wherein the vehicle has a width and the waterslide surface has a width and said sliding surface width is greater than said vehicle width.

81. The waterslide amusement ride feature of claim 32, wherein a pair of side walls extend upward from the bottom surface of the water flume; and
   wherein at least one side wall of the pair of side walls includes at least one spray nozzle configured to supply water lubricant on the waterslide sliding surface.

82. The waterslide amusement ride feature of claim 32, wherein the water flume descends into a splash pool.

83. The waterslide amusement ride feature of claim 32, wherein the vehicle is a raft.

84. The waterslide amusement ride feature of claim 32, wherein the vehicle is an inner-tube style vehicle.

85. The method of 35, wherein the vehicle is a raft.

86. The method of claim 35, wherein the vehicle is an inner-tube style vehicle.

87. The method of claim 39, wherein a pair of side walls extend upward from the waterslide sliding surface, each sidewall having a height; and
   wherein when the vehicle slides on the waterslide sliding surface, the vehicle is substantially below the height of each side wall.

88. The method of claim 39, further comprising providing said sensors upstream of, and along a linear motor portion of the waterslide sliding surface bearing the linear motor, said sensors detecting a linear speed of the vehicle as it approaches the linear motor portion and while it is in said linear motor portion, and said controller controlling the linear motor as a function of the detected speed to achieve a predetermined desired speed of the vehicle as it exits the linear motor portion.

89. The method of claim 39, wherein the vehicle is a raft.

90. The method of claim 39, wherein the vehicle is an inner-tube style vehicle.

91. The flume-style waterslide amusement ride feature of claim 51, wherein the raft has a width and the waterslide sliding surface has a width and said sliding surface width is greater than said raft width.

92. The flume-style waterslide amusement ride feature of claim 51, further comprising sensors for detecting a vehicle parameter of the raft, said vehicle parameter comprising at least one of a linear speed, a rotational speed, a direction of movement, a weight and a position of the raft, and a controller for operating the linear motor as a function of the detected vehicle parameter of the raft.

93. The flume-style waterslide amusement ride feature of claim 92, wherein said sensors are provided upstream of, and along a linear motor portion of the flume bearing the linear motor, said sensors adapted to detect a linear speed of the raft as it approaches the linear motor portion and while it is in said linear motor portion, said controller is adapted to control the linear motor as a function of the detected speed to achieve a predetermined desired speed of the raft as it exits the linear motor portion.

94. An amusement ride feature comprising:
a sliding surface;
a vehicle adapted to slide on said sliding surface and to convey at least one rider thereon;
a linear motor associated with the vehicle and the sliding surface for affecting sliding motion of the vehicle on the sliding surface; and
sensors for detecting a vehicle parameter of the vehicle, said vehicle parameter comprising at least one of a linear speed, a rotational speed, a direction of movement, a weight and a position of the vehicle, and a controller for operating the linear motor as a function of the detected vehicle parameter of the vehicle;
wherein the linear motor is a linear induction motor;
wherein the sliding surface is a waterslide sliding surface;
wherein said linear motor comprises at least one reaction plate mounted to said vehicle;
wherein the ride feature is flume-style, the sliding surface is a bottom surface of a water flume, and said vehicle is adapted to convey said at least one rider along said water flume; and
wherein said sensors are provided upstream of, and along a linear motor portion of the flume bearing the linear motor, said sensors adapted to detect a linear speed of the vehicle as it approaches the linear motor portion and while it is in said linear motor portion, and said controller is adapted to control the linear motor as a function of the detected speed to achieve a predetermined desired speed of the vehicle as it exits the linear motor portion.

95. A method of controlling the sliding motion of a vehicle sliding on a sliding surface in a waterslide amusement ride, comprising:
providing the sliding surface;
placing the vehicle on the sliding surface; and
operating a linear motor associated with the vehicle and the sliding surface;
wherein the linear motor is a linear induction motor;
wherein the sliding surface is a waterslide sliding surface;
wherein said linear motor comprises at least one reaction plate mounted to said vehicle;
wherein a pair of side walls extend upward from the waterslide sliding surface, each sidewall having a height; and
wherein when the vehicle slides on the waterslide sliding surface, the vehicle is substantially below the height of each side wall; and
the method further comprising providing sensors for detecting a vehicle parameter of the vehicle, said vehicle parameter comprising at least one of a linear speed, a rotational speed, a direction of movement, a weight and a position of the vehicle; providing a controller for operating the linear motor as a function of the detected vehicle parameter of the vehicle; and operating the controller to operate the linear motor as a function of the detected vehicle parameter of the vehicle.

96. A method of controlling the sliding motion of a vehicle sliding on a sliding surface in a waterslide amusement ride, comprising:
providing the sliding surface;
placing the vehicle on the sliding surface; and
operating a linear motor associated with the vehicle and the sliding surface;
wherein the linear motor is a linear induction motor;
wherein the sliding surface is a waterslide sliding surface; and
wherein said linear motor comprises at least one reaction plate mounted to said vehicle;
the method further comprising providing sensors for detecting a vehicle parameter of the vehicle, said vehicle parameter comprising at least one of a linear speed, a rotational speed, a direction of movement, a weight and a position of the vehicle; providing a controller for operating the linear motor as a function of the detected vehicle parameter of the vehicle; and operating the controller to operate the linear motor as a function of the detected vehicle parameter of the vehicle; and
the method further comprising providing said sensors upstream of, and along a linear motor portion of the waterslide sliding surface bearing the linear motor, said sensors detecting a linear speed of the vehicle as it approaches the linear motor portion and while it is in said linear motor portion, and said controller controlling the linear motor as a function of the detected speed to achieve a predetermined desired speed of the vehicle as exits the linear motor portion.

* * * * *